No. 733,093. PATENTED JULY 7, 1903.
E. THOMSON.
MEANS FOR REGULATING THE POWER OF AUTOMOBILES.
APPLICATION FILED JULY 21, 1900.
NO MODEL. 2 SHEETS—SHEET 1.
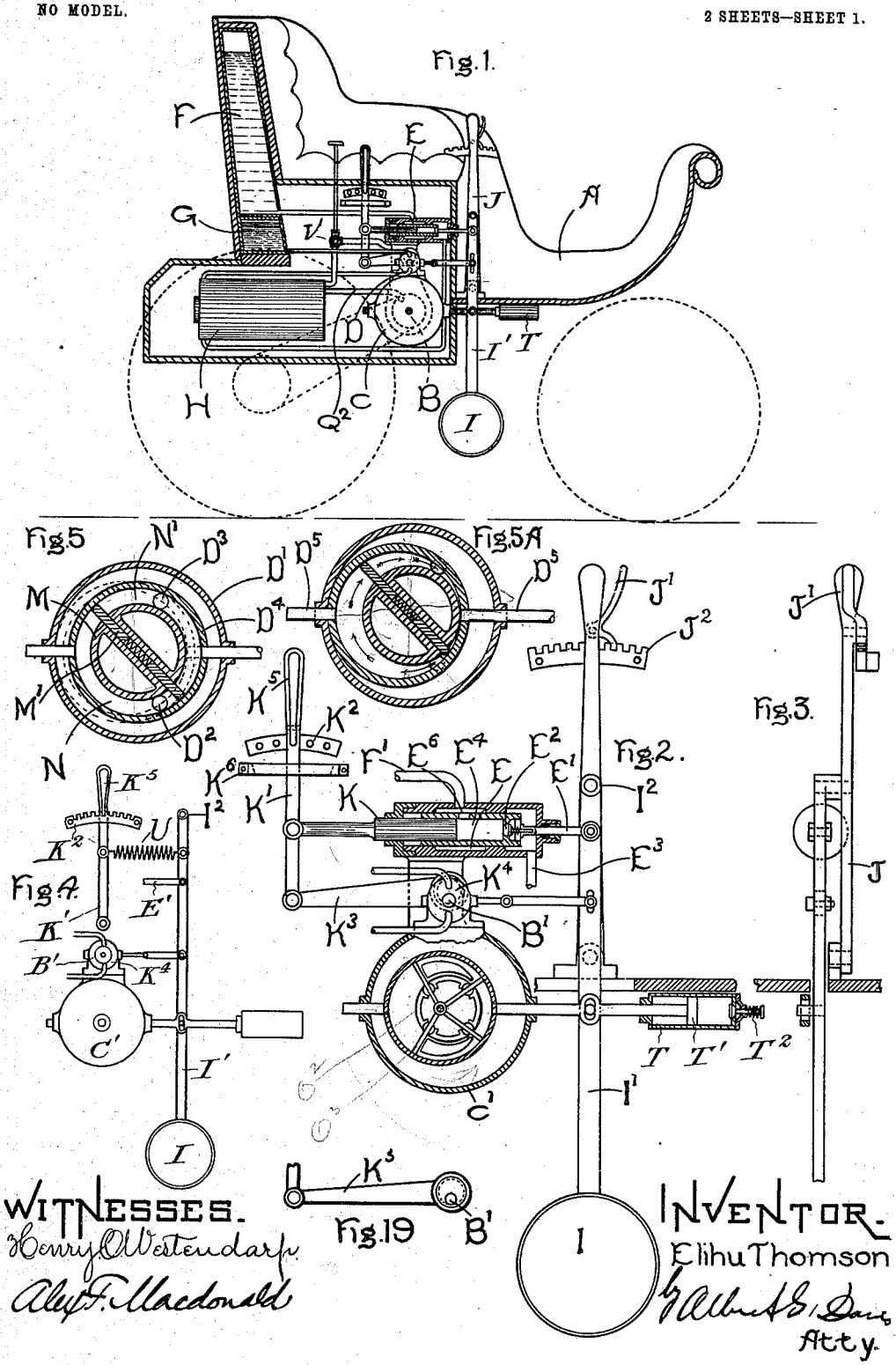
WITNESSES.
Henry O. Westendarp
Alex F. Macdonald
INVENTOR.
Elihu Thomson
by Albert G. Davis
Atty.

No. 733,093. PATENTED JULY 7, 1903.
E. THOMSON.
MEANS FOR REGULATING THE POWER OF AUTOMOBILES.
APPLICATION FILED JULY 21, 1900.
NO MODEL. 2 SHEETS—SHEET 2.
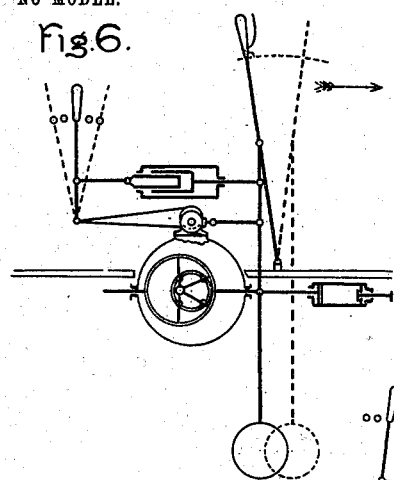
Fig.6.
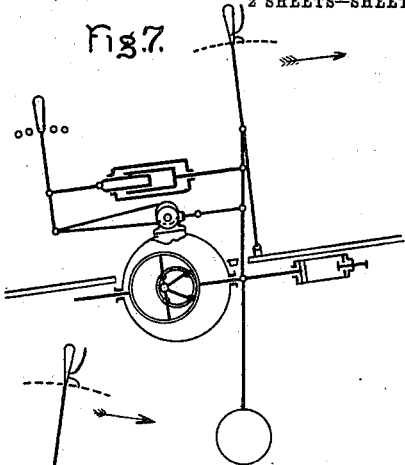
Fig.7.
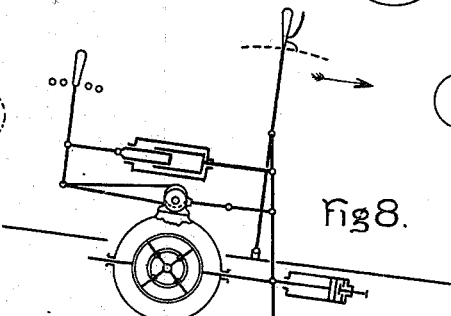
Fig.8.
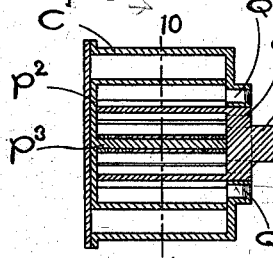
Fig.9.
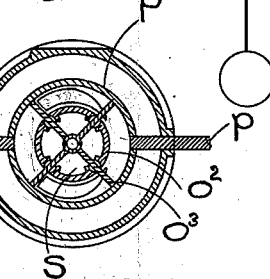
Fig.10.
Fig.11.
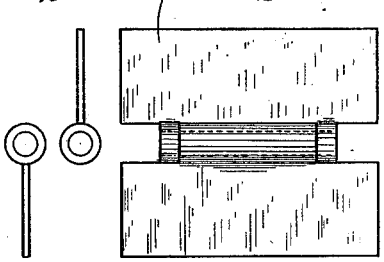
Fig.12.
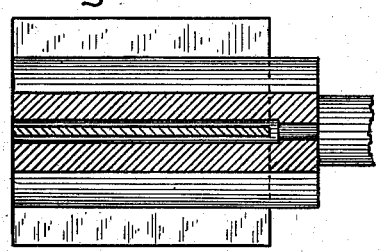
Fig.13.
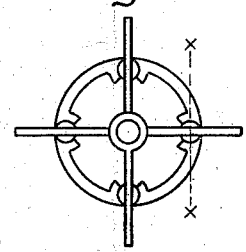
Fig.14.
Fig.15.
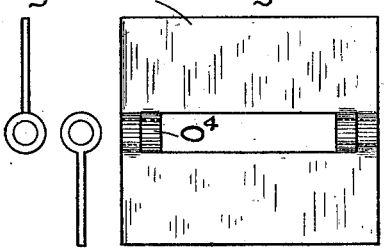
Fig.16.
Fig.17. Fig.18.
WITNESSES.
Henry O. Westendarp.
Alex F. Macdonald.
INVENTOR
Elihu Thomson
by Albert G. Davis
Atty.

No. 733,093.

Patented July 7, 1903.

UNITED STATES PATENT OFFICE.

ELIHU THOMSON, OF SWAMPSCOTT, MASSACHUSETTS.

MEANS FOR REGULATING THE POWER OF AUTOMOBILES.

SPECIFICATION forming part of Letters Patent No. 733,093, dated July 7, 1903.

Application filed July 21, 1900. Serial No. 24,383. (No model.)

*To all whom it may concern:*

Be it known that I, ELIHU THOMSON, a citizen of the United States, residing at Swampscott, in the county of Essex and State of Massachusetts, have invented certain new and useful Improvements in Means for Regulating the Power of Automobiles, of which the following is a specification.

In the operation of automobiles it sometimes happens that a greater or a less amount of power is required at one time than another to maintain a given speed. This may be due to the fact that the vehicle is traveling up or down a grade or to the condition of the road.

My invention has for its object to provide a regulating means independent of the speed-controlling device which will automatically increase or decrease the power of the motive device as the vehicle ascends or descends a grade.

My invention also contemplates a means for rendering in a measure this auxiliary controller or regulator manually adjustable, so that when for any reason it is desired to have more or less power the auxiliary controller can be adjusted to meet the new condition without, however, entirely destroying the automatic feature of regulation.

In the accompanying drawings, which illustrate one form of my invention, Figure 1 is a sectional view of a steam-operated vehicle. Fig. 2 is an enlarged detail view, partially in section, of the air, fuel, and water pumps. Fig. 3 is a partial end view of the apparatus shown in Fig. 2. Fig. 4 is a side elevation of a modified form of the pump-regulating means. Fig. 5 is a sectional view of the fuel-pump. Fig. 5$^a$ is a sectional view of the fuel-pump shown in the position of maximum effective stroke. Fig. 6 is a diagram representing the parts set to operate under maximum conditions and on a level road. Fig. 7 is a diagram representing the parts working under maximum conditions as the vehicle moves up a grade. Fig. 8 is diagram representing the parts working under minimum conditions as the vehicle moves down a grade. Figs. 9 and 10 are sectional views of a pump, the latter figure being a section taken on line 10 10 of Fig. 9. Figs. 11 and 12 are detail views of the pistons. Figs. 13 and 14 are detail views of the pump-piston. Figs. 15 and 16 are further detail views of the pistons. Figs. 17 and 18 are details of the piston-guides and supports, and Fig. 19 is a detail view of the eccentric for driving the water-pump.

Referring to Fig. 1, A represents the body of a vehicle, which is mounted in any desired manner on the wheels, the latter being shown in dotted lines. Under the vehicle-seat are located the engine B, (which is belted or geared to the wheels,) the air-pump C, the fuel-pump D, and the water-pump E. Back of the seat are the water and fuel tanks F and G, and below these tanks are the boiler H and its usual burner. The pumps are all driven direct from the propelling-engine, although separate means may be provided, if desired. In order to vary the power and speed of vehicles of this class, it is customary to regulate the amount of water supplied to the boiler, the amount of fuel supplied to the burner, and in some instances the amount of air which is mixed with the fuel. This control has been accomplished in various ways—as, for example, by regulators acted upon by the steam or water pressure.

My invention contemplates automatically regulating the supply of water and fuel in accordance with the profile of the route traveled over—that is to say, when the vehicle is ascending a grade the amount of fuel and water, and in some instances the air for the fuel mixture, is proportionately increased, and when the vehicle is descending a grade the amount is correspondingly decreased. It also contemplates the manual adjustment of the proportions of fuel, water, and air, either with or without the automatic feature, when for any reason it is considered desirable, and this irrespective of the profile of the route traveled over.

In all the above instances it is to be understood that the usual starting, stopping, and reversing means are provided.

In carrying out my invention a pendulum-weight is employed which by its changes in position due to variations in the grade of the road changes the effective stroke of the several pumps.

Referring particularly to Figs. 2 and 3, I represents the pendulum-weight, which is on the lower end of the arm I', the latter being pivotally secured to a lever J. The pendulum is suspended from pivot I² in such manner that it is free to move as the vehicle follows the profile of the path traveled over. In other words, as the vehicle ascends a grade it will move backward an amount proportional to the grade and when the vehicle descends a grade it will move forward from a central position an amount depending upon said grade.

The water-pump E is of the ordinary displacement variety, the outer cylinder or casing being rigidly secured to the engine-frame, while the inner cylinder E⁴, which also forms the valve, is connected to the pendulum-arm by a rod E', the latter passing through a suitable stuffing-box. The inner cylinder is provided with a valve-opening E⁶, through which water enters from the tank by the pipe F'. In the right-hand end of the cylinder is a spring-pressed puppet-valve E², which when the pressure rises to a predetermined amount opens and the water is forced into the boiler through the pipe E³. Working within the cylinder is a piston K, and by changing the relative positions of the valve-opening E⁶ and the piston more or less water will be forced into the boiler. The outer end of the piston is pivotally secured to a lever K', the latter being pivotally secured at its upper end to a support K² and at its lower end pivotally secured to an arm K³, the plate K⁶ acting as a guide therefor. Motion is imparted to the piston by the arm K³ and the eccentric K⁴, secured to an engine-shaft B', Fig. 19. The pin for supporting the upper end of the arm K' is carried by a latch K⁵, which is pivoted to the arm in such manner that the pin can be withdrawn from one hole and inserted in another. This adjustment is in the nature of a permanent one; but of course it may be changed to suit the road conditions. If for any reason it is desired to force water into the boiler manually, the pin on the latch may be withdrawn and the arm K' worked to and fro by hand, the eccentric driven arm acting as a support.

The fuel-pump (best illustrated in section in Figs. 5 and 5ª) consists of an outer stationary cylindrical casing D', that is secured to the engine-frame, and communicating with this casing are two ports D² and D³, the former being the inlet and the latter the outlet. Located within the casing is a movable ring D⁴, which is supported by two outwardly-extending rods D⁵, that are provided with bearings in the casing D'. The right-hand rod is extended somewhat to form a connection with the pendulum-arm I', so that as the pendulum swings the ring will occupy a more or less eccentric position with respect to the casing D', as indicated in dotted lines, Fig. 5, and in full lines, Fig. 5ª. Located within the ring and maintained at all times concentric with the casing is a rotary member M, which is driven by the shaft B' of the engine. The rotary member is slotted through its central portion, and mounted therein are two vanes M'. These vanes are always pressed outwardly by the compression-spring located between them, and as the ring D⁴ is shifted they move in and out. With the parts arranged concentrically, as shown in Fig. 5, no pumping action takes place, for the two chambers N and N', formed by the vanes and rings, are the same size at all times irrespective of the angular position of the vanes; but as soon as the ring is moved to a non-concentric position the pumping action begins. Assuming, as an example, the dotted-line position of the ring Fig. 5 and the full-line position Fig. 5ª, which is the maximum pumping position, as the vanes are rotated in a clockwise direction the chamber N gradually increases in size owing to the eccentric relation of the parts, and the result is a sucking action, which draws fuel from the tank through the port D². In the chamber N', which, it is assumed, has been previously filled in the manner described, the opposite action is taking place—that is to say, the chamber N is continually growing smaller, due to the eccentric relation of the ring, and as it grows smaller the advancing vane, acting as a piston, forces the fuel to the burner through the port D³. Of course intermediate positions of the ring will give pumping effects between zero and maximum.

The internal construction of the air-pump differs slightly from that of the fuel-pump, although the feature of a ring movable from a concentric to a non-concentric position is preserved.

Referring more particularly to Figs. 9 to 18, inclusive, C' represents a casing which is closed at the front end by a plate, while the back end is partially closed by a flange on the casing and partially by the head O, the latter forming an enlargement on the driving-shaft O'. The shaft O' is driven by the engine and may be directly connected or driven through a speed-changing device. Formed integral with the head or otherwise secured thereto is a cylindrical portion O², which is slotted to receive the vanes O³. These vanes are four in number and divide the space within the ring into chambers S, two of the vanes being of the form shown in Figs. 11 and 12, the other two being of the form shown in Figs. 15 and 16. Mounted for lateral movement on studs P is a ring P'. The right-hand stud is prolonged and is connected to the pendulum-arm I' by a pin-and-slot connection which permits the arm to move in the arc of a circle without causing the studs to bind. As this ring changes its position it moves from a concentric to a non-concentric position, or vice versa, with respect to the center of motion of the driving-shaft. This ring is closed at one end by a plate P², and secured thereto is a stud P³, upon which are sleeved the movable vanes O³, the extension O⁴ on one set of vanes being interspaced with those of the other set. As the shaft O' revolves the vanes rotate and also move slightly with respect to each other to compensate for changes in position of the movable ring, as shown in Figs. 2, 6, and 7. In the rear end of the outer casing are inlet and outlet ports Q and Q', the former receiving air directly or through a screen to prevent entrance of foreign substances, while the latter is connected by a pipe Q² with the burner, Fig. 1. In order to furnish a bearing and a guide for each vane, the slots in the tubular portion of the head O are bored out to receive the cylindrical slotted pins R. These pins are provided with a cylindrical end R' for supporting them, which fit into holes in the head O. As the vanes move in and out and around the central stud P³, due to the shifting of the ring P', they assume positions such as those shown in Figs. 2, 6, 7, and 8, the pins R acting as guides and bearings. The action of this pump is similar to that of the fuel-pump described above—that is to say, when the center of the stud carrying the vanes is concentric with respect to that of the ring the chambers S remain of a constant size, and no pumping action takes place; but as soon as an eccentric relation of the parts is assumed the size of the chambers gradually increases from minimum to maximum for a given position of parts as the shaft O' revolves, and the pumping action begins.

In order to check the too-violent movements of the pendulum I, a retarding device is preferably employed, which may be of any suitable construction. The one shown consists of a dash-pot comprising a cylinder T and a piston T', the latter being connected in any desirable manner to the arm I'. The cylinder is provided with a spring-pressed valve T², which permits the piston to move backward or to the left with considerable freedom, but retards its forward movement. The cylinder may be filled with glycerin or some similar material, if desired, in which case the valve arrangement would be slightly altered, so as to prevent the escape of the liquid. In addition to checking sudden movements of the pendulum the dash-pot performs another useful function—that is to say, as the vehicle travels over a rough road or is subjected to a great deal of heavy vibration the pendulum, owing to its vibrations, gradually pumps itself to a position where it increases the effective stroke of the several pumps, thereby increasing the driving power of the vehicle. This feature of operation will be apparent when it is considered that the pendulum is comparatively free to move backward owing to the opening of the valve, but is prevented from sudden movements forward owing to the closing of the valve.

The several pumps are first adjusted so that they will supply the proper amount of water, fuel, and air for ordinary work, either by individual adjustment or by setting the arm J. This might be called a "permanent" adjustment. When the road is particularly bad or when for any reason it is desired to obtain more power, it may be obtained by moving the lever J, which carries the pivot of the pendulum, backward, or, as shown in the drawings, to the left. This increases the eccentric relation of the parts, and consequently the amount of fluid furnished by each pump. When it is desired to obtain less power, the lever J is moved forward, and the latch J', engaging with the rack J², serves to hold it in any desired position.

In Fig. 4 a slightly-modified arrangement of the parts is shown. The lever J is pivoted at the lower end, as before, and is provided at its upper end with a latch J', which works in the rack J². Instead of pivoting the pendulum-lever I on the rod it is pivoted at I² on a separate support, and a spring U is employed to connect the parts. This spring always has a certain tendency to increase the effective stroke of the pump, and by changing its tension this tendency can be increased or diminished at will. In this case, as before, the dash-pot will be adjusted to suit the conditions.

I have shown the pumps arranged to control the supply of water, fuel, and air; but it is to be understood that one, or even two, of the said supplies may be entirely independent of this control.

Referring to the diagrams, Fig. 6 represents the vehicle traveling along a level road under what I call "manual" control—that is to say, the lever J has been moved backward to an extreme position, so that each of the pumps is supplying approximately its maximum amount of fluid. The lever K' may be set in any one of its several positions, depending upon the amount of water desired. When the parts are in this position, there is little chance shown for the pendulum to increase the effective strokes of the pumps when a hill is reached; but it is as effective as ever on the downgrades. Of course if it is desired the maximum-power position of the lever J may be well within the limits of operation of the pendulum, in which case the automatic control would be preserved, as before.

In Fig. 7 the lever J is set in its middle position and the vehicle is under automatic control in so far as the adjustment of the pumps is concerned. In other words, the pendulum I has assumed a backward or lagging position, due to the profile of the path traveled over by the vehicle, and the same effect is obtained as in Fig. 6.

In Fig. 8 it is assumed that the vehicle is going downhill and the pendulum has moved forward, thus bringing the pumps into a position where they will pump little or no fluid, depending upon their original adjustment or relation of parts.

The speed of the engine is controlled in the usual manner by the throttle V, and for the sake of simplicity the reversing mechanism has been omitted.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

Having thus described my invention, what I claim as new, and desire to secure by Letters Patent of the United States, is—

1. In an automobile, the combination of a motor, a boiler, a means governed by the changes in profile of the path traveled over, for varying the amount of water supplied to the boiler and a manually-actuated device for modifying the action of said means.

2. In an automobile, the combination of a motor, a boiler, a pendulum capable of swinging to and fro as the grade changes for automatically varying the amount of water supplied to the boiler, and a handle for adjusting the pivot of the pendulum.

3. In an automobile, the combination of a motor, a pump, a regulator for the pump, and means independent of the regulator and controlled by the changes in the grade of the path traveled over for increasing and decreasing the effective stroke of the pump for any given position of the regulator.

4. In an automobile, the combination of a motive device, a variable-stroke pump, and a means for varying the effective stroke of the pump, which is controlled automatically by changes in the grade of the route traveled over.

5. In an automobile, the combination of a motive device, a fuel-pump, means governed by the vehicle as it moves over its path of travel for varying the amount of fuel delivered by the pump, and a device for adjusting said means independent of changes due to vehicle movements.

6. In combination, a source of fuel-supply, a fuel-pump, a support for the parts which is capable of assuming various angular positions, and a means for varying the effective stroke of the pump which is controlled by the movements of the support.

7. In an automobile, the combination of sources of fuel and water supply, water and fuel pumps, a support for the pumps which is capable of changing its angular position with respect to a normal plane, and a gravity device which changes the effective strokes of the pumps as the angular position of the support changes.

8. In an automobile, the combination of a propelling device, a fuel-pump, a water-pump, fuel and water tanks, a pendulum pivotally supported by the vehicle in such manner that it is capable of swinging, and means acted upon by the pendulum for varying the amount of fuel and water delivered by the pumps.

9. In an automobile, the combination of a boiler, a burner, fuel and water tanks, a pump for supplying fuel to the burner, a pump for supplying water to the boiler, and a pendulum acted upon by changes in the angular position of the vehicle for varying the effective stroke of the pumps.

10. In combination, a support which is capable of assuming different angular positions, a pump supported thereby, a pivoted regulator for the pump, and manual means for adjusting the position of the pivot.

11. In combination, a vehicle, a motive device, a source of supply, a pendulum-regulator for controlling the said source, and a manually-actuated device for moving the pivot of the pendulum whereby the effectiveness of the regulator is changed.

12. In combination, a motive device, a source of power, a pendulum for controlling the said source and an adjustable lever on which the pendulum is pivotally secured, whereby the effectiveness of the pendulum may be varied.

13. In a vehicle, the combination of a motive device, a source of power therefor, a controlling device for regulating the amount of power supplied to the motive device, a gravity-actuated mechanism for actuating the controlling device, and a retarding means for checking violent movements of said gravity-actuated mechanism.

14. In a vehicle, the combination of a motor, a source of power, a regulator therefor, a pendulum acting by its movements to vary the amount of power delivered, and a dashpot for retarding the movements of the pendulum.

15. The combination of a shaft, a vane driven thereby, a ring adjustable to and from a concentric position with respect to the shaft, and a gravity device for adjusting the ring and shaft with respect to each other.

In witness whereof I have hereunto set my hand this 19th day of July, A. D. 1900.

ELIHU THOMSON.

Witnesses:
DUGALD McKILLOP,
HENRY O. WESTENDARP.